United States Patent
Youn et al.

(10) Patent No.: US 7,701,084 B2
(45) Date of Patent: Apr. 20, 2010

(54) UNIVERSAL POWER SUPPLY APPARATUS

(76) Inventors: Dae-Young Youn, 305-1604 Expo Apt. Jeonmin-dong, Yuseong-gu, Daejeon (KR) 305-761; Hyun-June Kim, 408-902 Expo Apt. Jeonmin-dong, Yuseong-gu, Daejeon (KR) 305-762

( * ) Notice: Subject to any disclaimer, the term of this patent is extended or adjusted under 35 U.S.C. 154(b) by 68 days.

(21) Appl. No.: 12/094,883

(22) PCT Filed: Apr. 4, 2006

(86) PCT No.: PCT/KR2006/001260

§ 371 (c)(1),
(2), (4) Date: May 23, 2008

(87) PCT Pub. No.: WO2007/108570

PCT Pub. Date: Sep. 27, 2007

(65) Prior Publication Data
US 2009/0096294 A1    Apr. 16, 2009

(30) Foreign Application Priority Data
Mar. 20, 2006    (KR) .................. 10-2006-0025410

(51) Int. Cl.
*H02J 1/10* (2006.01)
(52) U.S. Cl. ........................................... 307/29
(58) Field of Classification Search .............. 307/18, 307/29
See application file for complete search history.

(56) References Cited

U.S. PATENT DOCUMENTS

| | | | |
|---|---|---|---|
| 5,421,734 A * | 6/1995 | MacWilliams | 439/59 |
| 6,459,604 B1 | 10/2002 | Youn et al. | |
| 6,765,365 B2 | 7/2004 | Kim et al. | |
| 7,041,400 B2 | 5/2006 | Kim et al. | |
| 2006/0183381 A1 * | 8/2006 | Lanni | 439/677 |

FOREIGN PATENT DOCUMENTS

| | | |
|---|---|---|
| JP | 02260618 A | 10/1990 |
| JP | 2002262451 A | 9/2002 |
| JP | 2003273976 A | 9/2003 |

OTHER PUBLICATIONS

International Search Report for Serial No. PCT/KR2006/001260 dated Dec. 18, 2006.

* cited by examiner

*Primary Examiner*—Robert L. Deberadinis
(74) *Attorney, Agent, or Firm*—Michael Blaine Brookes, P.C.; Michael B. Brooks

(57) ABSTRACT

The present invention relates to a power supply apparatus, more particularity to a universal power supply apparatus which is applicable to various portable electronics devices made by different manufacturers and having different functions by selecting a tip having a shape suited for the portable electronic devices. The universal power supply apparatus of the present invention comprises a keyway (321) having the information on a mechanical key (411) which can select a voltage suited for the portable electronic devices and combined with a tip (400) and the key (411) and an output converting section (200) being capable of converting ON/OFF information of the keyway (321) into an output. The keyway can covert the mechanical information of key into the electrical information.

12 Claims, 4 Drawing Sheets

( 1: Short with (−) or (+) line, )
( 0: Open (N/C) )

UNIVERSAL POWER SUPPLY APPARATUS

TECHNICAL FIELD

The present invention relates to a power supply apparatus, more particularity to a universal power supply apparatus which is applicable to various portable electronics devices made by different manufacturers and having different functions by selecting a tip having a shape suited for the portable electronic devices.

BACKGROUND ART

The portable electronic device such as a laptop computer, a personal digital assistant (PDA), a portable digital video disk (DVD), a camcorder, a digital camera, a cellular phone and the like is provided with a battery during traveling. To charge the battery and use the equipment, DC power with a suitable voltage should be applied to the battery and the equipment through a connector having a proper shape. However, rated voltages of the portable electronic devices differ form each other according to the kinds of the device as well as the manufacturer, and shapes of input section to which DC power is supplied are different form each other according to the kinds of devices. Accordingly, the user having the various kinds of portable electronic devices should be carrying several power supply devices which are generally called as "adapter" and should purchase several adapters according to the electronic device, and so the user suffers economical loss.

As an attempt to solve the above problems, the universal power supply apparatus is provided. The universal power supply apparatus is a power supply apparatus which is applicable to various kinds of portable electronic devices with one main unit.

In such universal power supply apparatus, a detachable tip or cable which is applied in the different manners according to a shape of power input terminal of the device should be provided and a method for setting a voltage suited for the electronic device to be used should be provided.

In the conventional universal power supply apparatus general well known, a voltage of the device to be used is set in the main unit by using dip switch, rotary switch or a resistance substance with a special shape as disclosed in U.S. Pat. No. 5,347,211 and a tip or cable separated from the main unit and corresponding to a shape of power input terminal of the electronic device to be used is provided. However, the universal power supply apparatus has a drawback that the user finds the tip or cable which can be used for the portable electronic device and set a voltage suitable for the electronic device in the main unit so that it is difficult to use the universal power supply apparatus for the consumer with no electronic knowledge or skills.

In order to overcome the above drawbacks, a method for providing a special unit being capable of changing a voltage at the tip or cable in the entire cable is disclosed in U.S. Pat. No. 5,510,691, U.S. Pat. No. 6,604,177, U.S. Pat. No. 6,091,611 and the like. The special unit used in the above method comprises at least one of electronic elements such as resistor, condenser, diode and the like, this unit is generally referred to as "a daughter electronic circuit". However, when such electronic element is mounted to the tip, it is difficult to manufacture and inspect the tip, and a manufacturing cost of the tip is increased. In particular, there is a drawback that it is most difficult to minimize the tip.

DISCLOSURE

Technical Problem

An object of the present invention is to provide a universal power supply apparatus which is applicable to various portable electronics devices made by different manufacturers and having different rated voltages through only a selection of a proper tip by providing a tip 400 having a mechanical key 411 containing the information of tip suitable for the portable electronic device a cable 300 having a keyway 321 being capable of converting a state of the key 411 into an electrical signal.

Technical Solution

The present invention is characterized in that a tip 400 transmits the information required for the tip to a keyway 321 installed in a main unit with a key 411 having a mechanical concave/recess without an attached circuit consisted of electrical elements.

Also, the main unit 100 used in the present invention is characterized in that a switching mode power supply (SMPS) circuit using a pulse width modulation (PWM) manner used in the conventional power supply apparatus comprises an output selection section 200 receives the information of the key 411 contained in the tip with the keyway 321 and can select a desired voltage.

Accordingly, the tip 400 including the key 411 provided in the present invention has no electrical device except (+) and (−) lines through which a power can be supplied to the tip. Accordingly, compared with the conventional tip having a daughter electronic circuit to which the additional elements are mounted, separated from the conventional main unit, the tip is advantageous in that a miniaturization of the tip can be achieved, it is easy to manufacture and inspect the tip and a manufacturing cost becomes lower.

Once DC power is inputted from vehicle, airplane and the like, the power supply apparatus provided in the present invention can be provided as a universal DC/DC adaptor used for the portable electronic devices having shapes of input terminals, which differs from each other, by selecting the proper tip 400 with one main unit. Also, the power supply apparatus can be provided as a universal AC/DC adaptor when AC power is inputted, and can be provided as an external type universal battery pack if DC power generated from a battery mounted therein is inputted.

The universal power supply apparatus of the present invention consists of the 400 including the key required for selecting the voltage and the main unit 100 including the keyway 321 being capable of converting the mechanical information of the key 411 contained in the tip into the electrical information and transmitting it to the output selection section 200, the tip 400 can be separated from the main unit 100.

Unlike the conventional method including insertion of the electrical elements such as resistor, diode, condenser and the like, the present invention is characterized in that the tip 400 provided in the present invention is configured such that the output selection section of the main unit 100 can select the required voltage with only a mechanical concave/convex, and the present invention is characterized in that the main unit 100 of the present invention comprises the keyway 321 receiving the mechanical information of the key 411 included in the tip and converting it into the electrical signal. An example of device which can be used in the keyway 321 satisfying the above object can be a small-sized ON/OFF switch. This switch is in "ON" state if the key 411 has the concave/convex, and if there is no concave/convex in the switch, the switch can transmit four states which are different from each other when the switch has two keys (as show in FIG. 3).

The present is characterized in the main unit 100 further comprises the output selection section 200 be capable of receiving a state of the key 411 included in the tip provided in the present invention and providing the a proper voltage to a SMPS type power converting circuit controlled by the conventional PWM manner such as the boost type, buck type and fly-back type circuit.

Also, the output selection section 200 provided in the present invention consists of a resistor array comprising one or more resistor which can change a distribution value of set voltage into a feedback terminal of the PWM controller IC.

The cable unit 300 provided in the present invention connects the tip and the main unit and comprises the keyway 321 in which one of (+) pole connection, (−) pole connection, and open (no connection either (+) or (−) pole states, as a mechanical connection with the key 411 included in the tip beside (+) and (−) lines which can be seen in the general cable, is set; and a signal line through a connection state between the key 411 and the key 321 can be transmitted to the output selection section 200 of the main unit.

The keyway 321 provided in the present invention is the device being capable of converting the information of key 411 which is a structural element into the electrical information, the preferable example of the keyway can be a small-sized ON/OFF switch which can be installed at a position at which the key is connected to the tip 400.

If the cable suited for DC power provided from the vehicle, air plane and the like is installed at the input terminal 110 of the main unit and the boost type or buck type circuit is designed, the universal power supply apparatus provided by the present invention is an universal DC/DC adapter. If AC connector to which AC power is inputted is installed and the apparatus is designed as the fly-back circuit type, the universal power supply apparatus by the present invention is an universal AC/DC adapter. Also, If the battery and a circuit for controlling the battery are provided in the apparatus and the voltage boost type or buck type circuit using a battery DC power as the input is designed, the universal power supply apparatus is an external type universal battery pack which can use portable electronic devices without the adapter.

Advantageous Effects

As described above, once the user selects the proper tip according to the electronic device to be used, a necessary power voltage is automatically adjusted, and so the manufacturers can manufacture the circuit part of the power supply apparatus in common to save manufacturing cost. Also, the merchandisers distinguish the tip through a recognizable mark and sell conveniently the tip, and the users can use conveniently the various kinds of portable electronics devices through only change of the tips.

Furthermore, the power supply apparatus can be provided as the universal DC/DC adapter by installing a cable suited for DC power from the vehicle, air plane and the like at an input apparatus by the present invention and finishing with a case, and the power supply apparatus can be provided as an external type universal battery pack if the battery is provided therein.

In the universal power supply apparatus according to the present invention, there is no need to insert the electronic elements in the tip, and various voltages can be selected by only mechanical connection state between key in the tip and keyway in the cable. Also, compared with the conventional universal power supply apparatus provided with the attached circuit, the universal power supply apparatus according to the present invention have advantageous in that a manufacturing process can be simplified, a miniaturization of the tip can be achieved and a manufacturing cost can be saved.

DESCRIPTION OF DRAWINGS

The above and other objects, features and advantages of the present invention will become apparent from the following description of preferred embodiments given in conjunction with the accompanying drawings, in which.

BEST MODE

Hereinafter, the embodiments of the present invention will be described in detail with reference to accompanying drawings.

Figure 1:
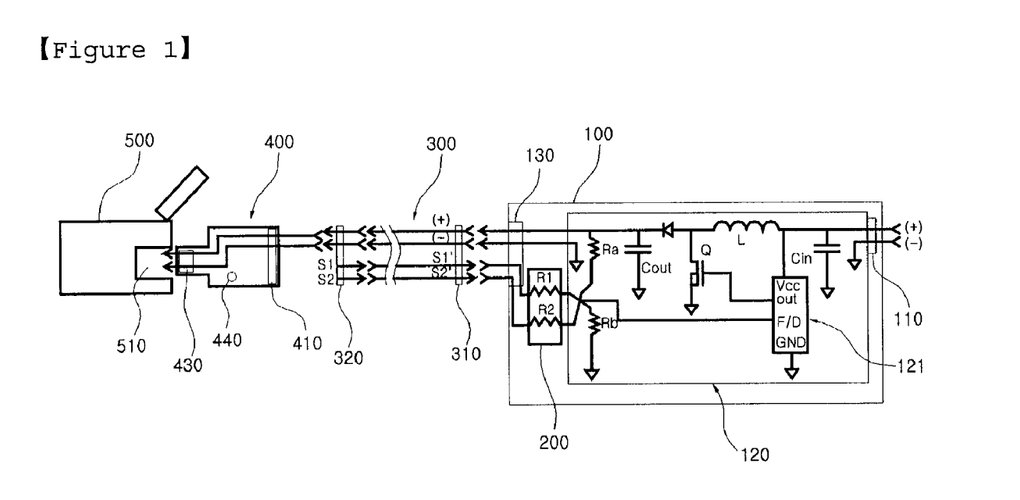
FIG. 1 is a view showing a boost type DC/DC converter using two key/keyway according to one embodiment of the present invention.

FIG. 1 is a view showing a boost type DC/DC converter using a tip 400 having two keys 411 according to one embodiment of the present invention. Here, the number of structures for selecting a voltage except a (+) cable and a (−) cable is defined as the number of key 411.

A main unit 100 in FIG. 1 further comprises an output selection section 200 which can analyze information based on a connection state between the key 411 comprised in the tip 400 and a key way 321 and then transmits the different outputs to a switching mode power supply circuit (hereinafter, referred to as "SMPS circuit") using the conventional pulse width modulation (hereinafter, referred to as "PWM"). Accordingly, the main unit 100 comprises a power input terminal 110 being an element of the SMPS using the PWM and provided for receiving DC power; a voltage converting section 120 constituted of the conventional SMPS circuit comprising a PWM controller IC 121 which can compare the predetermined voltage with a current state and then transmit an output to a gate terminal of a FET Q for enabling a pulse width to be changed; the key 411 comprised in the tip 400 provided in a circuit comprising a power output terminal 130; and the output selection section 200 comprising a circuit which changes a set voltage inputted to a feedback terminal of the PWM controller IC with the information on a connection state of the keyway 321.

The power input terminal 110 is the terminal to which direct current power discharged from the power source is applied. The direct current power mentioned in this specification is not limited to any direct current power generated in the vehicle, air plane, battery and the like. Accordingly, a cable with a certain shape such as a cigar jack or an air jack for the vehicle and the like, an AC power terminal for domestic use and a PCB pattern in which DC power, not a direct DC power generated in the battery, but obtained by an additional circuit, is set can be used as the power input terminal of the present invention. As described above, the present invention is applicable to the power sources having various configuration and shapes.

The voltage converting section 120 is the conventional SMPS circuit comprising the PWM controller IC 121 which can compare a set voltage as a distribution of resistance value of an outside of the IC with an inner reference voltage and a current state and then transmit an output to the gate terminal of the FET Q for enabling a pulse width to be changed and has a feedback terminal and an output terminal. A boost type circuit, a buck type circuit and a fly-back type circuit can be used as the voltage converting section. Various kinds of PWM controller integrated circuits such as the Max668, TL494, UCC3843, UCC38H43 and the like can be used as the PWM controller IC used in the circuit of the present invention.

The voltage converting section 120 of the present invention comprises inevitably the PWM controller IC 121 which is a constitutional element of the SMPS circuit, the FET Q which is a switching device, a diode D, an inductor or a transformer L and condensers $C_{in}$ and $C_{out}$ for smoothing an input voltage and an output voltage. However, the above elements can be connected to each other by another manner according to a state of a kind of the input to be used and the voltage to be outputted to form a boost type circuit, a buck type circuit or a fly-back type circuit. Also, a basic circuit of the voltage converting section 120 provided in the present invention comprises a circuit for securing a stability such as a circuit for blocking an overcurrent and separating an input from the output. A circuit for removing the electromagnetic wave and an additional circuit for displaying an operation state can be used additionally in the basic circuit of the voltage converting section.

The output selection section 200 comprises resistor arrays $R_1 \sim R_n$ which can change a distribution value of set voltage to a feedback terminal of the PWM controller IC 121 according to a state of the keyway 321 ($S_1 \sim S_n$) included in the tip 400. The kind of voltage which can be outputted is decided by the number of the used keyway 312 and the number of resistor array included in the output selection section 200.

A cable unit 300 functions as a role for connecting the main unit 100 provided in the present invention to the tip 400, and consists of a cable input terminal 310 connected to the main unit 100, a cable output terminal 320 connected to the tip 400, an inner cable connecting the input terminal and the output terminal, and an external casing packaging the inner cable. The cable input terminal 310 is connected to an output terminal of the main unit 100.

In the present invention, according to the kind of device to which the input section is connected, the input section can be formed integrally with the main unit by fixing the input section to the main unit or the input section can be connected detachably to the main unit by using a connector. However, the connecting manner is not limited thereto.

The keyway 321 of the present invention is a device for converting the structural information of the key 411 provided in the present invention into the electrical information, this keyway is characterized in that the keyway transmits ON (connection to (+) or (−) line) signal or OFF (open with (+) or (−) line) signal to the main unit according to a concave/convex of the key 411 received in the tip when the keyway is combined with the tip 400 after an ON/OFF switch is provided in the output section 320 of the main unit, and a shape of the keyway and a place on which the keyway is provided are not limited.

An output terminal 430 of the tip is manufactured such that the output terminal has a shape and polarity corresponding to those of a power input terminal 510 of a portable electronic device 500.

A selected information display section 440 functions as a role of a mean for displaying a state set in the tip to the user, this selected information display section 440 consists of the numeral information formed by marking numerals on an outside of the tip, the color information marked on an end or a body of the tip and an user manual which is additionally provided. The numeral information is formed by marking different numerals or signs according to a shape and a set voltage of the output terminal 430 of the tip, and the color information is formed by marking different colors according to a voltage to be set in the tip. First, the manufacturer manufactures the tip having a voltage and a shape of a connector suited for the portable electronic device and marks the numeral information and the color information on an outside of the tip to form such selected information display section 440. Then, the manufacturer provides the model name and the directions for use of the portable electronic device on the user manual.

The user reads the user manual to select the tip 400 which can be used for his own portable electronic device and then connects the selected tip to the cable output terminal 320 to use. Accordingly, the user with no electronic knowledge or skills can use conveniently the tip.

However, it is impossible to represent the entire usable portable electronic devices on the user manual by using only such numeral information. Accordingly, the color information enables the user to select the tip suited for his own portable electronic device which is not represented in the user manual. First, the user having portable electronic device which is not represented in the user manual selects the tip fitted mechanically to a DC input terminal of the electronic device. Once the user finds the suitable tip, the user decides whether the voltage generated from the tip is suited to the electronic device to be used or not on the basis of the color information and then uses the tip. The yellow, red and black colored color information can be selected optionally and variously according to its definition.

Figure 2:
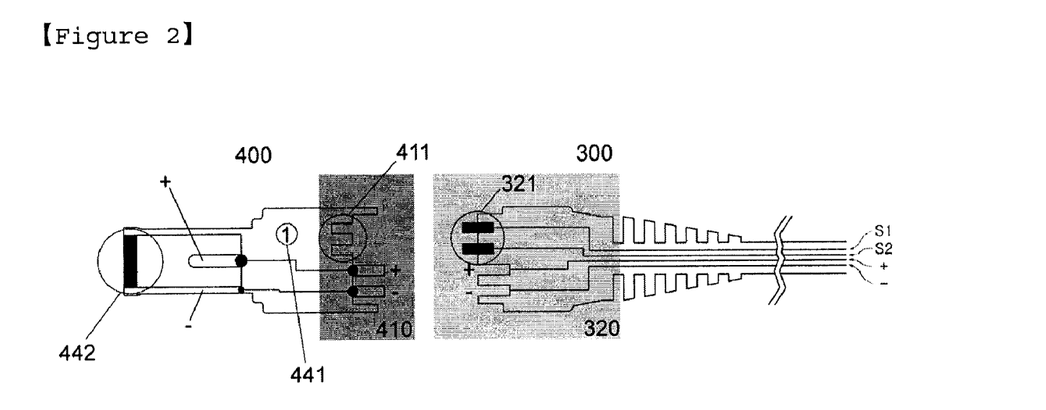
FIG. 2 is a view showing an appearance of a tip and cable having the key/keyway according to the present invention.

FIG. 2 shows an appearance of the tip 200 having two keys 411 and the cable 300 seen from one side thereof. First, the selected information display section 440 is provided on an appearance of the tip 400. The selected information display section is divided into a numeral information display section 441 and a color information display section 442. The numeral information display section 441 is formed on a body of the tip and has twenty or more numerals, which are different from each other, according to a shape and voltage fitted to the DC input terminal of the electronic device to be used, and, the color information display section 442 is formed at an end of the tip having an insulating section formed at an end thereof. If an insulating section is not formed, the color information display section is formed on the body of the tip. Below, the key 411 and the keyway 321 are described in detail.

(+) and (−) connecting sections and the key 411 functioning as a mean for selecting substantially the voltage are provided on the tip 400. It is desirable that, as shown in FIG. 2, the keyway 321 has a shape of a button which is protruded from an end portion of the cable output terminal 320 so that the keyway can function as a role of an ON/OFF switch operated by pushing. Also, if the keyway 321 has a button shape, it is preferably that the key 411 is formed in the shape of a concave/convex formed on a surface of end portion of the tip input terminal 421 such that the key presses or does not press a specific button when the key is combined with the keyway. In this embodiment, the key 411 is formed in the shape of a concave/convex and the keyway 321 is formed in the shape of two buttons. At this time, although the keyway 321 is formed in the shape of button, the keyway is manufactured such that the keyway is contacted with the (+) pole or the (−) pole according to a degree of press, and a depth of the key 411 is determined according to a shape of the keyway. As one example, the keyway 321 is manufactured such that the keyway is contacted with the (+) pole when the keyway 321 is pressed deeply and the keyway is contacted with the (−) pole when the keyway 321 is pressed shallowly. To this end, the key 411 is formed in the shape of a horizontal plane (without concave/convex surface) to achieve contact between the key and the (+) pole and in the shape of a concave portion to achieve contact between the key and the (−) pole. However, in a case that the key is formed in the shape of a concave portion, the key is manufactured such that a depth of the key is smaller than that of a concave portion when the key and the (−) pole become a short state by not pressing the keyway 321, however the key has a depth enough to contact with the (−) pole in the keyway 321. In addition, a button for contacting the key with the (+) pole and another button for contacting the key with the (−) pole, that is, two buttons can be provided on the keyway 321. In this case, according to a location of each button, the key 411 is formed in the shape of the horizontal plane which can press the button or in the shape of concave portion which does not press the button. Of course, with respect to one key 411, instead of three states of contacting with the (+) pole/ contacting with the (−) pole/open, two states of contacting with the (+) pole/open or contacting with the (−) pole/open can be achieved by connecting only (+) line or (−) line to each keyway 321.

Figure 3:
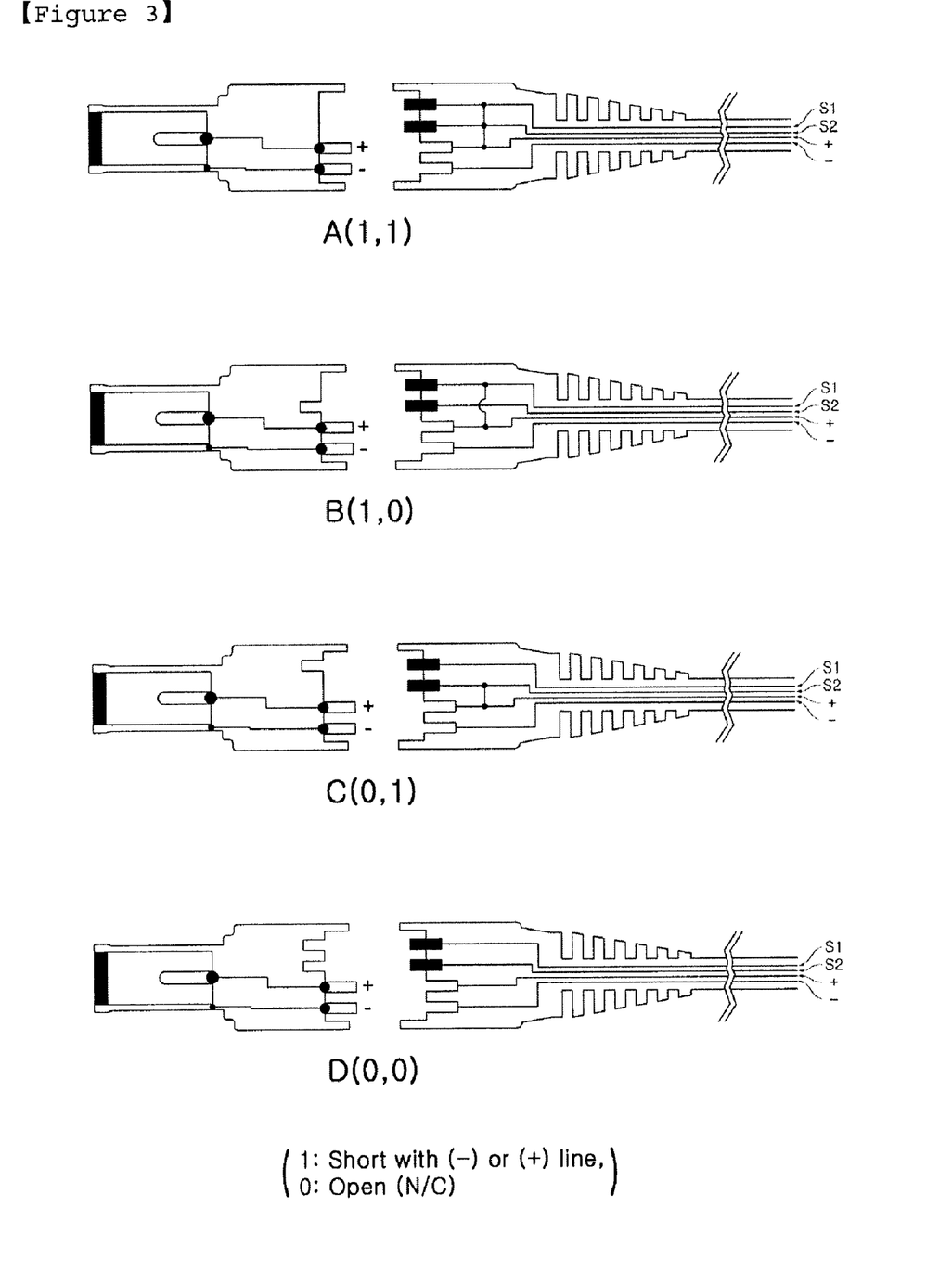
FIG. 3 is a view illustrating of an example of key/keyway status according to the present invention.

In the embodiment as shown in FIG. 2, a small-sized ON/OFF switch which can turn on/off two (−) lines is provided at the output terminal 320 of the main unit with the keyway 321. That is, only two states of connection/open between the key and the (−) line are achieved on one key 411/keyway 321. FIG. 3 shows four formations which can be obtained by the key 411/keyway 321 in a case of the key 411/keyway 321 provided with two keys as shown in FIG. 2. Also, FIG. 3 illustrates an electrical analysis of the keyway 321 with respect to each state. As shown in the drawing, if two keys 411 having two states of connecting to the (−) line are provided, four different states can be achieved. Without departing from the scope of the present invention, the key 411 and keyway 321 can be designed such that the key has two states of connecting to the (+) line or has three states of connecting with the (+) line, connecting with the (−) line, open to the line. One or more such keys 411 may be provided.

Again, referring to FIG. 2, the tip 400 consists of the tip input terminal 410, the key 411 provided at an end portion of the tip input terminal 410, the tip output terminal 430 connected to a DC input section of the portable electronic device and the selected information display section 440. The tip input terminal 410 comprises two power pins including (+) and (−) and the key 411 decided by the number of voltage to be set. The tip input terminal has a shape of the connector which can be fixed to/detached conveniently from the output terminal 320 of the cable. In the embodiment shown in FIG. 2, the key 411 can transmit two states of short and connection to the keyway 321. According, if there are N keys 411 designed as described in this embodiment, it is possible to manufacture the tip has 2N states.

A variation of output voltage caused by using the key 411/the keyway 321 as shown in FIG. 2 is described in detail. First, when an output voltage in the circuit using the PWM controller IC 121 is referred to as "$V_{out}$" and a reference voltage of an error amplifier provided at a feedback terminal in the PWM controller IC is referred to as "$V_{ref}$", the output voltage $V_{out}$ is defined as $V_{ref}*(R_a+R_b)/R_b$, that is, $V_{ref}*(1+R_a/R_b)$ (here, each symbol is based on FIG. 1). Accordingly, when one key 411 using one selected terminal $S_1$, that is, one resistor $R_1$, and one keyway 321 are used, the obtained outputs of three states are determined by the follow equation (1) in the short state, by the follow equation (2) in the (−) connection state and by the follow equation (3) in the (+) connection state;

$$V_{out}=V_{ref}(1+R_a/R_b) \qquad \text{Equation (1):}$$

$$V_{out}=V_{ref}\{1+R_a*(R_b+R_1)/R_bR_1\} \qquad \text{Equation (2):}$$

$$V_{out}=V_{ref}\{1+(R_aR_1)/(R_a+R_1)*(1/R_b)\} \qquad \text{Equation (3):}$$

As described above, according to a selection state, it is possible to select from three kinds of voltages to be obtained according to a connecting method with respect to one tip. As described above, of course, if the key is connected to only one of (+) line and (−) line, two kinds of voltages can be obtained. In order to set a selection state of the key/keyway for obtaining a specific voltage at one tip, the keyway 321 is provided at an end portion of the cable output terminal 320. Corresponding to this state, the key 411 is provided at an end portion of the tip input terminal 410 combined with an end portion of the cable output terminal 320.

FIG. 3 shows the key way 321 shown in FIG. 2 and four combinations of key 411/keyway 321 in one embodiment of the key 411. As mentioned above, a connecting state between the key 411 and the keyway 321 can represent a short and connection state. More specifically, in order to make the short state, the user does not connect the key to the keyway. In a case that two selection terminals $S_1'$ and $S_2'$, four combinations which differ from each other can be generated as shown in FIG. 3 and the below table. As shown in FIG. 3, the key 321 is formed in the form of the on/off switch which is pressed or not pressed according to the key 411, and so, according to a shape of the key 411, once the switch is pressed, the keyway 321 becomes a connection (on) state, and once the switch is not pressed, the keyway becomes a open (off) state.

|  | $S_1$ | $S_2$ |
| --- | --- | --- |
| FIG. 3 A (1,1) | Connection | Connection |
| FIG. 3 B (1,0) | Connection | Open |
| FIG. 3 C (0,1) | Open | Connection |
| FIG. 3 D (0,0) | Open | Open |

Below, a case of assembling the universal power supply apparatus for supplying the power to the notebook computer according to one embodiment of the present invention is described in detail.

In general, a most of laptop computer had 6~12 lithium batteries was provided power by voltage of 18~20 volt and 15~16 volt power supply. And, the portable DVD had 6~12 lithium batteries was provided by voltage of 12~13 volts. As one embodiment of the present invention to be applied to the above devices, the universal power supply apparatus having a power consumption of 45~150 watts and using one selection terminal $S_1$-$S_1'$ and a resistor $R_1$ of the output selection section was manufactured. This universal power supply apparatus is applicable to 80 percents or more of the notebook computer and the portable DVD on the current market. To this end, in the Max668 with a reference voltage of 1.25 volts, voltage of 15~16 volts was obtained in the open state by using $R_a$ of 45 K ohm, $R_b$ of 3.8 K ohm and $R_1$ of 150 K ohm, voltage of 18~20 volts was obtained in the (−) connecting state, and voltage of 12~13 volts was obtained in the (+) connecting state. Likewise, in the UCC38H43 with a reference voltage of 2.5 volts, the same results can be obtained under the condition that $R_a$, $R_b$ and $R_1$ is set at 20 K ohm, 3.8 K ohm and 62 K ohm, respectively.

At this time, a resistance value is not limited to this embodiment, but can be varied variously by determining a resistance and watt number satisfying the equations (1)~(3). Accordingly, the universal power supply apparatus which is applicable to various electronic devices can be obtained.

In a process of using the universal power supply apparatus manufactured on the basis of the above technical background, the user only changes and puts the tip 400 manufactured according to the standard into the device to convert the first voltage suited for the first device into the second voltage suited for the second device.

Also, as another example, for the PDA, the cellular phone, the camcorder, the digital camera and the portable DVD player using 1~6 lithium ion batteries, it is effective to manufacture the universal power supply apparatus which has a power consumption of 5~24 watt or less and can select 2~6 voltages using two or less key/keyway. The universal power supply apparatus having a power consumption of 18 watts and using one key/keyway with the first voltage condition [(+) pole connection] of 4~5 volts, the second voltage condition [open] of 9~10 volts and the third voltage condition [(−) pole connection] of 12~15 volts was manufactured by using the PWM controller IC using the reference voltage of 1.25 volts and $R_a$, $R_b$, $R_1$ of 21 K ohm, 3.4 K ohm and 20 K ohm, respectively, this universal power supply apparatus is applicable to 80 percents or more of the PDA, the cellular phone, the camcorder and the digital camera on the current market.

As described above, in the universal power supply apparatus, a magnitude of output voltage and a voltage selection condition are not limited to a narrow range, but can be varied infinitely according to a kind of the electronic devices to be used. As one example, if the universal power supply apparatus is constituted with a resistor array ($R_1$~$R_n$) using N resistors corresponding to N key/keyways ($S_1$~$S_n$), 3N voltages which differ from each other can be obtained by using the tip with 3N states.

Figure 4:
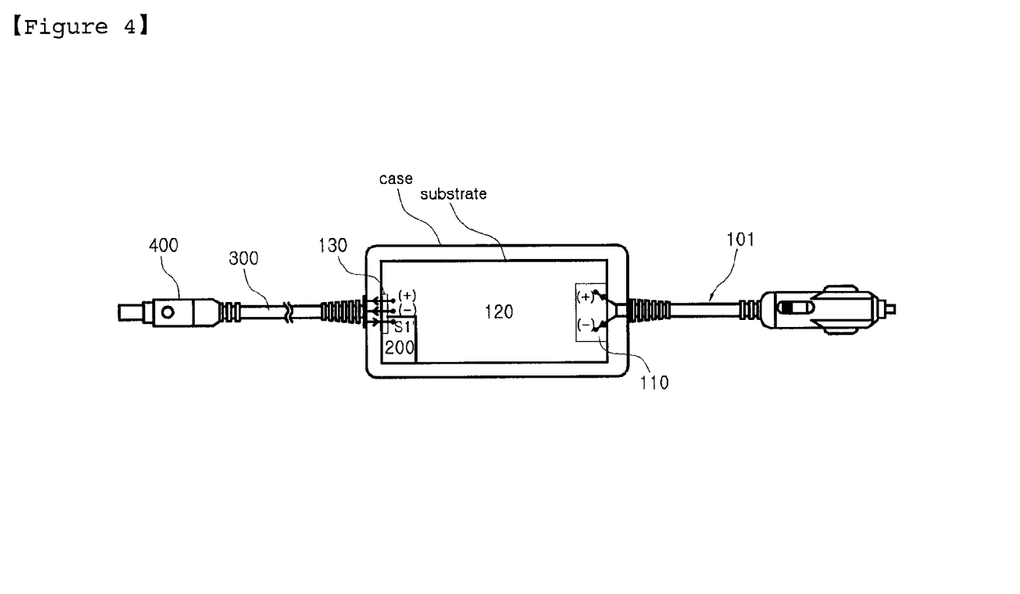
FIG. 4 is a view showing an universal DC/DC adapter according to the present invention.
Figure 5:
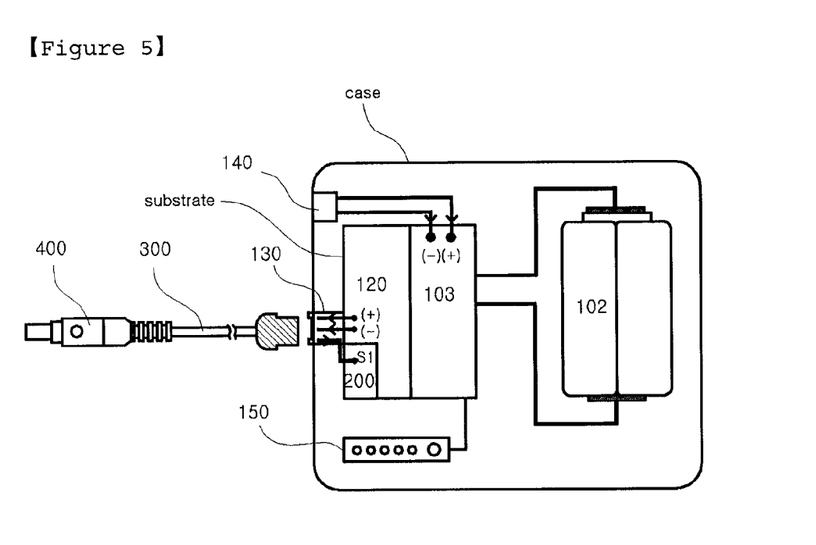
FIG. 5 is a view showing an universal external battery pack.
Figure 6:
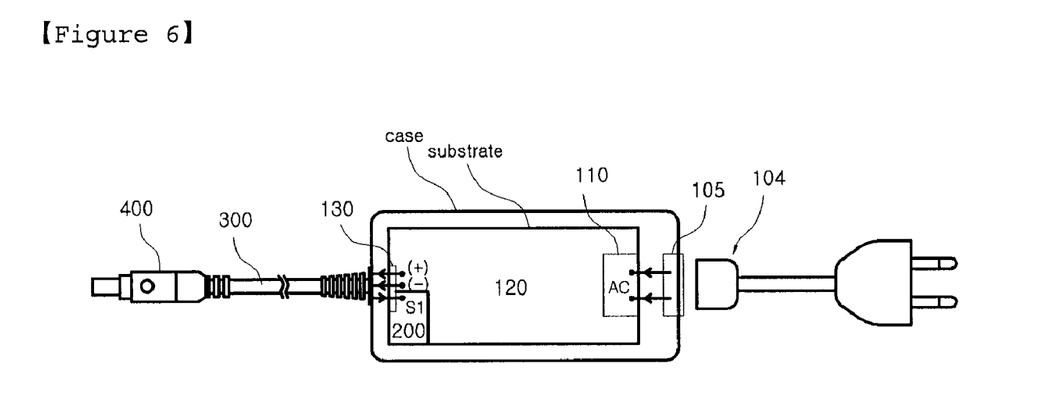
FIG. 6 is a view showing an universal AC/DC adapter according to the present invention.

FIG. 4 to FIG. 6 show the universal power supply apparatuses manufactured variously according to the present invention and the kind of external power source.

FIG. 4 shows an universal DC/DC adapter in which the main unit 100 is used as the substrate, an exterior power cable 101 to which DC power transmitted from a cigar jack of the vehicle is inputted is connected to the power input terminal 110 outer and the cable unit 300 is connected to the power output terminal 130 of the main unit, this adaptor is finished with a plastic case as the external case. A cable for the vehicle, a cable provided at a seat in the airplane or a cable connected to a specific DC power source and the like can be used as the exterior power cable 101 used in the process of manufacturing the above adaptor.

FIG. 5 shows an universal external battery pack in which a battery 102 and a circuit section 103 being capable of controlling the battery 102 are connected to an input terminal of the main unit 100 and a connector suited for an input terminal of the cable unit 300 is provided at the output terminal 130, this battery pack is finished with a case. This battery pack provides a voltage within a range of allowable input voltage for the portable electronic device, and so this battery pack can be used more effectively in the various places than the battery pack which has not this function. Primary cell such as alkaline cell, lithium ion cell, nickel-metal hydride (NiMH) cell, secondary cell such lead capacitor, fuel cell such as proton exchange membrane fuel cell (PEM FC) can be mounted as the battery 102 used in this battery pack. The circuit 103 for controlling the battery comprises a circuit for protecting the battery, a circuit for charging the battery and a user interface circuit for notifying an available battery capacity and the like to the user. Also, this external type battery pack comprises a terminal 140 used for charging and provided at an outside of the case and an user interface section 150 consisted of light emitting diode (LED) for notifying a battery capacity and a switch.

FIG. 6 shows an universal AC/DC adapter formed by connecting the cable unit 300 to the fly-back type SMPS in which the power input terminal 110 has a connector 105 to which an AC cable 104 can be connected and AC current is transmitted to the voltage converting section 120, this adaptor is finished with a case as the external case. Like the universal DC/DC adapter, the universal external battery pack, and the universal AC/DC adapter can be used for various kinds of portable electronic devices. There is a difference between the fly-back type SMPS mentioned above and the boost type DC/CD converting circuit disclosed in FIG. 1 that the fly-back type SMPS uses a transformer instead of an inductor and receives a feedback through an optocoupler. Like the boost type DC/CD converting circuit, however, the fly-back type has the output converting section 200 and analyzes the output terminal $S_1$ of the tip to make the outputs being different from each other and transmit them to the tip

INDUSTRIAL APPLICABILITY

The universal power supply apparatus can achieve the different rated voltages through a simply action for exchanging the tip that had mechanically different shape. The mechanical tip provided by the present invention can change voltage by using different shape tips, had advantageous in that a manufacturing process can be simplified, a manufacturing cost can be lowered and a minimized tip size can be achieved than the conventional tip that had the electronic elements such as resistor, diode, condenser.

The invention claimed is:

1. An universal power supply apparatus comprising;
   a tip 400 including a key 411 for selecting a voltage, a tip input terminal 410 and a tip output terminal 430; and
   a main unit 100 including a keyway 321 setting a mechanical coupling state with the key 411 and an output selecting section 200 converting and outputting a distribution value of a set voltage according to the mechanical coupling state between the key (411) and the keyway (321).

2. The universal power supply apparatus according to claim 1, wherein the keyway is formed in the shape of a button to enable a connection state of the key-keyway to display as a connection (on)/open (off) state, the key corresponding to the keyway has a concave/convex shape, a plane shape or a combination thereof such that a (+) pole connecting button is pushed, a (−) pole connecting button is pushed or open (no button is pushed) the key with the keyway.

3. The universal power supply apparatus according to claim 1, wherein the keyway is formed in the shape of a button which is pushed in two steps for (+) pole connection or (−) pole connection to enable a connection state of the key-keyway to display as a open/connection state, the key corresponding to the keyway has a concave/convex shape with a depth in the shape of three steps, a plane shape or a combination thereof such that the key corresponding to the keyway is contacted with the keyway to push the keyway by a degree which is the same as any one of two pushing steps or not to push the keyway.

4. The universal power supply apparatus according to claim 3, wherein the tip 400 can be exchanged and attached according to a necessary selecting voltage.

5. The universal power supply apparatus according to claim 3, wherein the tip 400 further comprises a selected information display section 440 for displaying a selection of the tip.

6. The universal power supply apparatus according to claim 5, wherein the selected information display section 440 consists of a numeral information display section 441 showing a suited form and a voltage on an input terminal of the electronic device and a color information display section 442 displaying a color information.

7. The universal power supply apparatus according to any one of claim 2 to claim 6, wherein the first voltage, the second voltage selected by a combination of the key and keyway are in the ranges of 15~16 volt and 18~20 volt, respectively.

8. The universal power supply apparatus according to any one of claim 2 to claim 6, wherein the first voltage condition, the second voltage condition, the third voltage condition selected by a conversion of combination of the key and keyway are in the ranges of 4~5 volt, 9~10 volt, 12~15 volt. respectively.

9. The universal power supply apparatus according to any one of claim 2 to claim 6, wherein the universal power supply apparatus is operated as the DC/DC adapter by using DC power as the power inputted to the main unit 100.

10. The universal power supply apparatus according to any one of claim 2 to claim 6, wherein the universal power supply apparatus is operated as an battery external pack by connecting a battery 102 and a battery controlling circuit section 103 to an input terminal of the main unit 100.

11. The universal power supply apparatus according to any one of claim 2 to claim 6, wherein the universal power supply apparatus is operated as the AC/DC adapter by using AC power as the power inputted to the main unit.

12. The universal power supply apparatus according to any one of claim 2 to claim 6, wherein a voltage converting section 120 comprises a PWM controller IC 121 which is an element of SMPS circuit, a FET (Q) which is a switching device, a diode (D), an inductor or transformer (L) and condensers ($C_{in}$, $C_{out}$) for smoothing voltages at the input and output sides.

* * * * *